(12) United States Patent
Maeda et al.

(10) Patent No.: US 12,097,569 B2
(45) Date of Patent: Sep. 24, 2024

(54) JOINED STRUCTURE AND METHOD FOR MANUFACTURING JOINED STRUCTURE

(71) Applicant: Kobe Steel, Ltd., Kobe (JP)

(72) Inventors: Kyohei Maeda, Kanagawa (JP); Reiichi Suzuki, Kanagawa (JP)

(73) Assignee: Kobe Steel, Ltd., Kobe (JP)

( * ) Notice: Subject to any disclaimer, the term of this patent is extended or adjusted under 35 U.S.C. 154(b) by 685 days.

(21) Appl. No.: 17/292,141

(22) PCT Filed: Sep. 19, 2019

(86) PCT No.: PCT/JP2019/036843
§ 371 (c)(1),
(2) Date: May 7, 2021

(87) PCT Pub. No.: WO2020/105266
PCT Pub. Date: May 28, 2020

(65) Prior Publication Data
US 2021/0394299 A1 Dec. 23, 2021

(30) Foreign Application Priority Data

Nov. 19, 2018 (JP) ................................ 2018-216804

(51) Int. Cl.
*B23K 11/34* (2006.01)
*B23K 11/11* (2006.01)
(Continued)

(52) U.S. Cl.
CPC ............ *B23K 11/34* (2013.01); *B23K 11/115* (2013.01); *B23K 11/163* (2013.01); *C21D 3/04* (2013.01);
(Continued)

(58) Field of Classification Search
CPC . B23K 11/115; B23K 11/16616; B23K 11/24; B23K 11/241; B23K 11/163;
(Continued)

(56) References Cited

U.S. PATENT DOCUMENTS

2012/0129006 A1 5/2012 Kanai et al.
2017/0008119 A1 1/2017 Nakazawa et al.
(Continued)

FOREIGN PATENT DOCUMENTS

CN 108025387 A 5/2018
JP 49-125251 A 11/1974
(Continued)

OTHER PUBLICATIONS

Wu Lin, et al., Intelligent Technologies for Welding, Aug. 31, 2000, 8 pages (with English translation).
(Continued)

*Primary Examiner* — Daniel J Wiley
(74) *Attorney, Agent, or Firm* — Oblon, McClelland, Maier & Neustadt, L.L.P.

(57) ABSTRACT

A joint structure, includes: a first member including a high tensile strength steel; a second member including a high tensile strength steel and superposed on the first member; a surface soft layer formed on at least one of a superposition surface of the first member, on which the second member is superposed, and a superposition surface of the second member, on which the first member is superposed; a molten-solidified portion formed by melting and solidifying the first member and the second member; and a heat affected zone formed around the molten-solidified portion, in which the surface soft layer has a total thickness of 5 μm to 200 μm, and the molten-solidified portion has a carbon amount of
(Continued)

0.21 mass % or more, and a maximum Vickers hardness of the surface soft layer in the heat affected zone is 100 Hv to 500 Hv.

16 Claims, 3 Drawing Sheets

(51) Int. Cl.
    *B23K 11/16*     (2006.01)
    *C21D 3/04*     (2006.01)
    *C22C 38/00*     (2006.01)
    *C22C 38/02*     (2006.01)
    *C22C 38/04*     (2006.01)
    *C22C 38/06*     (2006.01)
    *B23K 103/04*     (2006.01)

(52) U.S. Cl.
    CPC ............ *C22C 38/002* (2013.01); *C22C 38/02* (2013.01); *C22C 38/04* (2013.01); *C22C 38/06* (2013.01); *B23K 2103/04* (2018.08)

(58) Field of Classification Search
    CPC ....... C22C 38/02; C22C 38/002; C22C 38/04; C22C 38/06
    See application file for complete search history.

(56) References Cited

U.S. PATENT DOCUMENTS

| | | | |
|---|---|---|---|
| 2018/0243853 A1 | 8/2018 | Yoshinaga et al. | |
| 2020/0306866 A1 | 10/2020 | Nakazawa et al. | |
| 2020/0325554 A1* | 10/2020 | Takeda | C23C 2/28 |

FOREIGN PATENT DOCUMENTS

| | | |
|---|---|---|
| JP | 2002-103054 A | 4/2002 |
| JP | 2002-172469 A | 6/2002 |
| JP | 2008-106324 A | 5/2008 |
| JP | 2012-167338 A | 9/2012 |
| JP | 2013-10139 A | 1/2013 |
| JP | 2017-2384 A | 1/2017 |
| JP | 6388099 B1 | 9/2018 |
| WO | WO 2011/013793 A1 | 2/2011 |
| WO | WO 2015/137512 A1 | 9/2015 |

OTHER PUBLICATIONS

Ighodaro, O.L., et al., "Comparative effects of Al—Si and galvannealed coatings on the properties of resistance spot welded hot stamping steel joints", Journal of Materials Processing Technology, Elsevier, NL, vol. 236, Mar. 24, 2016 (Mar. 24, 2016), pp. 64-72.

International Search Report issued on Nov. 19, 2019 in PCT/JP2019/036843 filed on Sep. 19, 2019.

Japanese Office Action issued Oct. 26, 2021 in Japanese Patent Application No. 2018-216804 (with English translation), 23 pages.

Extended European Search Report issued Nov. 9, 2021 in European Patent Application No. 19886600.6, 9 pages.

Beshiyo, K., et al., "Spot Welding of High Tensile Strength Thin Steel Sheet", Sumitomo Metal, Sumitomo Metal Industries, Ltd. 26(2) (1974), p. 182-192 (with English translation).

Funakawa, Y., et al., "Effects of Sheet Thickness, Base Material Strength and Nugget Diameter on Cross Tensile Strength (Estimating Joint Strength of Spot Welded Joint—Report", Preprints of the National Meeting of the Japan Welding Society (54), Japan Welding Society, 1994, pp. 258-259 (with English translation).

Zhang, H., et al., "Microstructure and mechanical properties of resistance spot welded dissimilar thickness DP780/DP600 dual-phase steel joints", Materials and Design, vol. 54, Aug. 19, 2013 (Aug. 19, 2013), pp. 443-449.

Zinke, M., et al., "Resistance spot welding of high-strength and ultrahigh-strength coated ferritic steels with high-alloyed austenitic CrNi steels", Welding and Cutting, DVS, vol. 9, No. 1, Jan. 1, 2010 (Jan. 1, 2010), XP001551378, pp. 52-57.

\* cited by examiner

JOINED STRUCTURE AND METHOD FOR MANUFACTURING JOINED STRUCTURE

TECHNICAL FIELD

The present invention relates to a joint structure and a method for manufacturing the joint structure.

BACKGROUND ART

In recent years, in order to reduce the weight of a vehicle body and to enhance collision safety for the purpose of reducing the amount of $CO_2$ emissions, a high tensile strength steel (HTSS) sheet has been applied to a body frame of an automobile or the like, and a welding technique for a high tensile strength steel sheet (high strength steel sheet) capable of securing excellent quality of a welded portion has been demanded.

A typical welding quality evaluation item representing the quality of a welded portion includes static strength of a joint. The static strength includes tensile shear strength (TSS) and cross tensile strength (CTS), but in a high tensile strength steel sheet, toughness of a welded portion is reduced due to a large amount of C in a base plate component, and interface fracture or partial plug fracture (fracture in a nugget) is likely to occur when a load in a cross peel mode is applied. In particular, when a high tensile strength steel sheet having tensile strength of 980 MPa or higher is used, the tendency appears remarkably, and various measures have been taken to improve the cross tensile strength.

Patent Literature 1 discloses that, in order to prevent a decrease in toughness of a nugget and segregation of elements in the nugget, a content of C, Si, and Cr, which contribute to the toughness of the nugget, and a content of segregation elements P, S, and N are limited, whereby good cross tensile strength can be obtained.

However, mechanical properties (material strength and deformability) of a base plate itself are deteriorated due to limiting component amounts (components in steel) of various basic constituent elements in the steel described above.

Patent Literature 2 describes that good cross tension strength can be obtained by arc spot welding a sheet set obtained by superposing two high tensile strength steel sheets having a C amount of 0.07 mass % or more in steel components so that a relationship between a hardness Hv (BM) of a base plate and a hardness Hv (WM) of a weld bead (weld metal) satisfies 0.7≤Hv (WM)/Hv (BM)≤1.2.

The technique described in Patent Literature 2 relates to a technique of forming a welded portion having a predetermined hardness by diluting a welding base plate using a welding wire. In this technique, it is necessary to supply molten metal to a position where dilution is performed, which is difficult to control. In addition, a welded structure such as an automobile body needs to be welded at various angles (welding positions), and depending on the angle, it may not be possible to supply molten metal to a joint portion, which causes problems with weldability.

Patent Literature 3 describes that good cross tension strength can be obtained by forming a nugget having high toughness by a spot welding method using high-frequency heating, in which hardness decreases from an end portion to a center portion of the nugget.

The technique described in Patent Literature 3 relates to a technique for forming a welded portion having a predetermined hardness by spot welding using high-frequency heating, which requires a special spot welding machine.

That is, in the technique of the related art, in order to obtain good cross tension strength in a welded joint between high tensile strength steel sheets, a component (base plate component) in steel, particularly a carbon amount (C amount) has to be limited, and mechanical properties (material strength and deformability) of the base plate itself have to be sacrificed. Alternatively, since it is necessary to limit a welding method, it is inevitable that the weldability is hindered.

However, in order to cope with a strict $CO_2$ emission and collision safety, it is essential to apply a high component steel sheet having good formability. In addition, an arc spot welding method has a low degree of freedom in welding, and a portion applicable to automobile assembly is limited. Further, spot welding using high-frequency heating requires a special welding machine, which is problematic in terms of cost. For this reason, there is a demand for a construction method capable of improving high joint strength, that is, high cross tension strength (CTS) and weldability without sacrificing mechanical properties of a base plate in welding of a high tensile strength steel sheet.

CITATION LIST

Patent Literature

Patent Literature 1: JP-A-2012-167338
Patent Literature 2: JP-A-2013-10139
Patent Literature 3: WO2011/013793

SUMMARY OF INVENTION

Technical Problem

An object of the present invention is to provide a joint structure and a method for manufacturing the joint structure, which can increase toughness of a molten-solidified portion and improve joint strength (cross tension strength) without impairing weldability even in a high tensile strength steel sheet having good mechanical properties of a base plate and a large amount of carbon in steel.

Solution to Problem

The above object of the present invention is achieved by the following configuration [1] related to a joint structure.
 [1] A joint structure, comprising:
   a first member comprising a high tensile strength steel;
   a second member comprising a high tensile strength steel and superposed on the first member;
   a surface soft layer formed on at least one of a superposition surface of the first member, on which the second member is superposed, and a superposition surface of the second member, on which the first member is superposed;
   a molten-solidified portion formed by melting and solidifying the first member and the second member; and
   a heat affected zone formed around the molten-solidified portion,
   wherein the surface soft layer has a total thickness of 5 μm or more and 200 μm or less, and the molten-solidified portion has a carbon amount of 0.21% or more, and
   a maximum Vickers hardness of the surface soft layer in the heat affected zone is 100 Hv or more and 500 Hv or less.

In addition, a preferred embodiment of the present invention related to the joint structure relates to the following [2] to [4].

[2] The joint structure according to above [1], wherein the surface soft layer is a decarburized layer.

[3] The joint structure according to above [1] or [2], wherein a diameter D of the molten-solidified portion and a sheet thickness $t_{min}$ of a thinner one of a sheet thickness of the first member and a sheet thickness of the second member satisfy the following formula (3).

$$D \geq 3.5\sqrt{t_{min}} \tag{3}$$

[4] The joint structure according to any one of above [1] to [3], wherein a total thickness of the surface soft layer is 30 μm or more.

The above object of the present invention is achieved by the following configuration [5] related to a method for manufacturing the joint structure.

[5] A method for manufacturing the joint structure according to any one of above [1] to [4], the method comprising:

superposing the second member on the first member so that the surface soft layer formed on a surface of at least one of the first member and the second member is interposed between the first member and the second member, and then forming the molten-solidified portion by welding.

Advantageous Effects of Invention

According to the present invention, in joining of a high tensile strength steel sheet having good mechanical properties of a base plate and having a large amount of carbon in steel, toughness of a molten-solidified portion can be increased and joint strength (cross tension strength) can be improved without impairing weldability.

DESCRIPTION OF EMBODIMENTS

Hereinafter, embodiments of the present invention are described in detail with reference to the drawings.

<Basic Configuration of Joint Structure>

Figure 1:
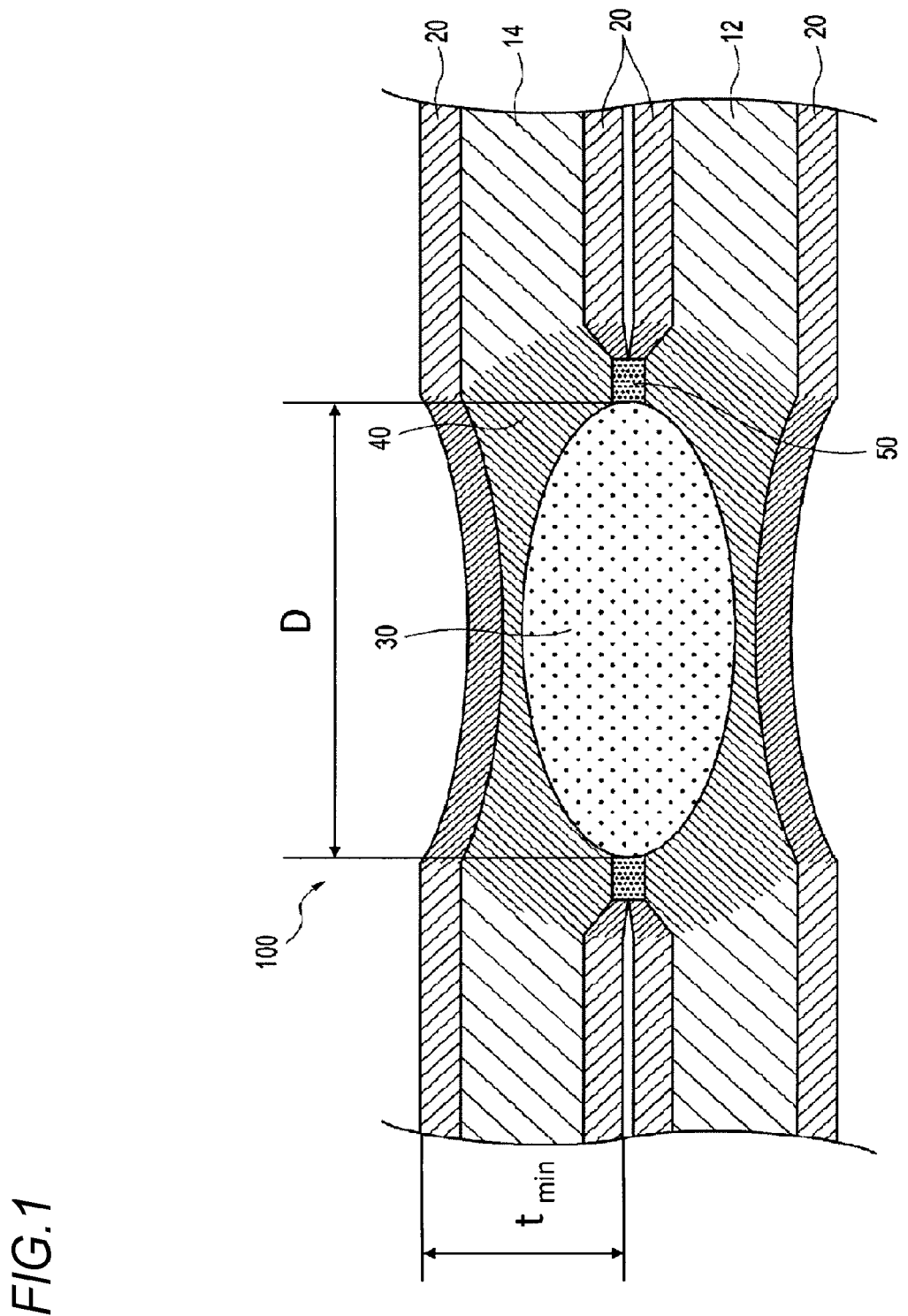
FIG. 1 is a cross-sectional view of a joint structure according to an embodiment of the present invention.

FIG. 1 is a cross-sectional view of a joint structure according to an embodiment of the present invention. A joint structure 100 of this configuration includes a first member 12 including a high tensile strength steel, a second member 14 including a high tensile strength steel and superposed on the first member 12, a surface soft layer 20 formed on at least one of a superposition surface of the first member 12, on which the second member 14 is superposed, and a superposition surface of the second member 14, on which the first member 12 is superposed, a molten-solidified portion 30, and a heat affected zone 40 formed around the molten-solidified portion 30. The high tensile strength steel of both the first member 12 and the second member 14 is a high tensile strength steel (HTSS) sheet having tensile strength of 440 MPa or higher.

The molten-solidified portion 30 is a joint portion formed by melting the first member 12 and the second member 14 by welding processing such as spot welding and then solidifying the first member 12 and the second member 14. The molten-solidified portion 30 firmly joins the first member 12 and the second member 14. In the case of welding using resistance welding such as spot welding, the molten-solidified portion 30 is also referred to as a nugget.

In addition, the heat affected zone (HAZ) 40 is a portion of a base plate in which a structure and mechanical properties are changed by welding heat and which is not melted. The heat affected zone 40 is located between a base plate portion which is not affected by heat in a region outside the heat affected zone 40 and the molten-solidified portion 30.

A corona bond 50, which is a ring-shaped portion subjected to solid phase welding, is formed around the molten-solidified portion 30.

Here, a carbon amount (C amount) is known as a factor affecting cross tension strength (CTS) in the joint structure 100. It is considered that, when a value of the carbon amount is equal to or less than a predetermined value (for example, less than 0.21 mass %), a fracture form in a cross tension test is good and a value of CTS is not reduced.

In addition, when the first member 12 and the second member 14 are melted and joined, a carbon amount (M1, M2) in the molten-solidified portion 30 is an average value of a carbon amount (M1) of the first member 12 and a carbon amount (M2) of the second member 14, as shown in the following formula (1).

$$\text{Carbon amount}(M1,M2) = \{\text{Carbon amount}(M1) + \text{Carbon amount}(M2)\}/2 \tag{1}$$

Here, when both the first member 12 and the second member 14 are high tensile strength steel sheets, the carbon amount of the molten-solidified portion 30 also becomes a high value at the same level as that of the first member 12 and the second member 14 since the carbon amount of each member is a relatively high value (for example, 0.21 mass % or more), and as a result, the value of CTS is reduced.

On the other hand, as shown in Patent Literature 1, CTS can be improved by limiting a component amount of various basic constituent elements in steel, particularly the carbon amount. However, when the carbon amount in steel is limited, there is a concern that the mechanical properties (material strength) of the steel itself may decrease. Therefore, it is difficult to weld high tensile strength steels to each other with good joint strength (cross tension strength).

Therefore, in the joint structure 100 according to the present embodiment, the surface soft layer 20 is formed on at least one of the superposition surface of the first member 12, on which the second member 14 is superposed, and the superposition surface of the second member 14, on which the first member 12 is superposed, while the value of the carbon amount in the molten-solidified portion 30 is set to a high value of 0.21 mass % or more, and a maximum Vickers hardness of the surface soft layer 20 in the heat affected zone 40, which is obtained by welding processing of the first member 12 and the second member 14, is controlled to be in a range of 100 Hv or more and 500 Hv or less.

By providing the surface soft layer 20 at an interface between the first member 12 and the second member 14, the maximum Vickers hardness of the surface soft layer 20 in the heat affected zone 40 formed around the molten-solidified portion 30, which is obtained when the first member 12 and the second member 14 are welded, (specifically, a portion of the surface soft layer 20 continuously formed around the corona bond 50 in the heat affected zone 40 as shown in FIG. 1) can be controlled to a predetermined value or less (specifically, 500 Hv or less). Here, a decarburized layer can be used as a suitable surface soft layer in which the maximum Vickers hardness of the surface soft layer 20 in the heat affected zone 40 can be controlled to a predetermined value or less. Since the decarburized layer is very thin as compared with the base plate, it is possible to enhance local deformability without substantially reducing strength of the base plate.

In cross tension, bending deformation is mainly applied to a material, and the deformability in the vicinity of a stress concentration point (specifically, in the vicinity of an end portion of the corona bond 50) is improved by controlling the maximum Vickers hardness of the surface soft layer 20 in the heat affected zone 40 to a predetermined value or less, so that the base plate portion can be preferentially deformed, and fracture in the molten-solidified portion 30 and brittle fracture in the heat affected zone 40 can be effectively prevented. In addition, since the corona bond 50 contained in the heat affected zone 40 is also softened, initial cracking and growth in the corona bond 50 can be prevented.

<Details of Joint Structure>

Next, each constituent element of the joint structure 100 having the above-described configuration will be described in detail.

(High Tensile Strength Steel Member)

As described above, the first member 12 and the second member 14 are high tensile strength steel (HTSS) sheets having tensile strength of 440 MPa or higher. The high tensile strength steel sheet is not particularly limited as long as the high tensile strength steel sheet has tensile strength of 440 MPa or higher, and may be, for example, a high tensile strength steel sheet having tensile strength of 590 MPa or higher, 780 MPa or higher, or 980 MPa or higher.

A known film usually applied to a steel material, such as a metal plating film of zinc, a zinc alloy, or the like, an organic resin film of paint or the like, a lubricant, and/or a lubricating oil, may be formed on one surface or both surfaces of the first member 12 and the second member 14. In addition, these films may be coated with a single layer used alone or a plurality of layers combined in combination.

The component amount in steel of the first member 12 and the second member 14 is not particularly limited, but a desirable range of the content of each element (C, Si, Mn, P, S, and other metal elements) contained in the steel and a reason for limiting the range will be described below. It is noted that a "%" indication of the content of each element means "mass %".

[C: 0.05% to 0.60%]

C is an element that contributes to improvement in base plate strength of steel, and is therefore an essential element for a high tensile strength steel sheet. Therefore, a lower limit of C content (carbon amount) is preferably 0.05% or more. On the other hand, when C is added excessively, a hardness of the molten-solidified portion 30 and the heat affected zone 40 is increased, so that good joint strength cannot be obtained. Therefore, an upper limit of the C content is preferably 0.60% or less, more preferably 0.40% or less, and still more preferably 0.20%.

When the first member 12 and the second member 14 are melted and joined, in order to set the carbon amount (M1, M2) in the molten-solidified portion 30 to 0.21 mass % or more, an average value of the carbon amount (M1) of the first member 12 and the carbon amount (M2) of the second member 14 needs to be 0.21 mass % or more.

[Si: 0.01% to 3.0%]

Si is an element that contributes to deoxidation. Therefore, a lower limit of Si content is preferably 0.01% or more. On the other hand, when Si is added excessively, temper softening resistance is increased, and the hardness of the molten-solidified portion 30 and the heat affected zone 40 becomes excessively high, so that good joint strength cannot be obtained. Therefore, an upper limit of the Si content is preferably 3.00% or less, more preferably 2.00% or less, and still more preferably 1.00% or less.

[Mn: 0.5% to 3.0%]

Mn is an element that contributes to improvement of hardenability, and is an essential element for forming a hard structure such as martensite. Therefore, a lower limit of Mn content is preferably 0.5% or more. On the other hand, when Mn is added excessively, the hardness of the molten-solidified portion 30 and the heat affected zone 40 becomes excessively high, so that good joint strength cannot be obtained. Therefore, an upper limit of the Mn content is preferably 3.0% or less, more preferably 2.5% or less, and still more preferably 2.0% or less.

[P: 0.05% or less (not including 0%)]

P is an element inevitably mixed into steel, is likely to segregate into a grain and a grain boundary, and reduces the toughness of the molten-solidified portion 30 and the heat affected zone 40, so it is desirable to reduce P as much as possible. Therefore, an upper limit of P content is preferably 0.05% or less, more preferably 0.04% or less, and still more preferably 0.02% or less.

[S: 0.05% or less (not including 0%)]

Similar to P, S is an element inevitably mixed into steel, is likely to segregate into a grain and a grain boundary, and reduces the toughness of the molten-solidified portion 30 and the heat affected zone 40, so it is desirable to reduce S as much as possible. Therefore, an upper limit of S content is preferably 0.05% or less, more preferably 0.04% or less, and still more preferably 0.02% or less.

[Other Metal Elements]

In the first member 12 and the second member 14 according to the present invention, except for C, Si, Mn, P, and S, it is preferable that Al is 1.0% or less (including 0%), N is 0.01% or less (including 0%), a total of Ti, V, Nb, and Zr is 0.1% or less (including 0%), a total of Cu, Ni, Cr, and Mo is 1.0% or less (including 0%), B is 0.01% or less (including 0%), and a total of Mg, Ca and REM is 0.01% or less (including 0%).

In addition, a balance is preferably Fe and an inevitable impurity. The inevitable impurity is an impurity that is inevitably mixed at the time of manufacturing steel, and may be contained within a range that does not impair various properties of the first member 12 and the second member 14.

The first member 12 and the second member 14 may have any sheet thickness as long as the first member 12 and the second member 14 can be welded. In general, a joint structure having a sheet thickness of 3 mm or less is used as the joint structure 100. A method for forming a high tensile strength steel member is not particularly limited, and for example, press forming, roll forming, or the like can be employed.

(Surface Soft Layer)

As shown in FIG. 1, the surface soft layer 20 is formed on at least one of the superposition surface of the first member 12, on which the second member 14 is superposed, and the superposition surface of the second member 14, on which the first member 12 is superposed. In FIG. 1, the surface soft layer 20 is formed on both surfaces of the first member 12 and the second member 14, but the surface soft layer 20 may be formed only on the surface of the first member 12 or only on the surface of the second member 14. The surface soft layer 20 is a soft structure having a lower Vickers hardness than that of the first member 12 and the second member 14, and is excellent in deformability. That is, when bending deformation is applied in cross tension, by forming the surface soft layer 20 on the surfaces of the first member 12 and the second member 14 as in the present embodiment, initial deformability is enhanced, occurrence of cracking in the heat affected zone 40 is prevented, and the base plate portion can be preferentially deformed. Therefore, formation of the surface soft layer 20 improves the cross tension strength (CTS).

A material of the surface soft layer 20 is not particularly limited as long as the material is a soft structure having a lower Vickers hardness than that of the first member 12 and the second member 14.

Therefore, when the first member 12 and the second member 14 are joined to each other, by forming a decarburized layer as the surface soft layer 20 between the first member 12 and the second member 14, a carbon amount (M1, M2, N) in the molten-solidified portion 30 of the first member 12 and the second member 14 becomes an average value of the carbon amount (M1) of the first member 12, the carbon amount (M2) of the second member 14, and a carbon amount (N) of the surface soft layer 20 (decarburized layer), as shown in the following formula (2). In this case, the molten-solidified portion 30 is diluted by the surface soft layer 20 (decarburized layer) having a lower carbon amount than that of the first member 12 and the second member 14, and has a lower carbon content than the carbon amount (M1) of the first member 12 and the carbon amount (M2) of the second member 14. As a result, a joint structure having excellent toughness and good joint strength is obtained due to a decrease in the carbon amount of the molten-solidified portion 30.

$$\text{Carbon amount}(M1, M2, N) = (\text{Carbon amount}(M1) + \text{Carbon amount}(M2) + \text{Carbon amount}(N))/3 \quad (2)$$

In order to sufficiently exhibit the dilution effect described above, it is preferable to form the surface soft layer 20 on both of the superposition surface of the first member 12, on which the second member 14 is superposed, and the superposition surface of the second member 14, on which the first member 12 is superposed.

In order to effectively exhibit such an effect by forming the surface soft layer 20, a total thickness of the surface soft layer 20 is set to 5 µm or more, preferably 20 µm or more, more preferably 30 µm or more, still more preferably 40 µm or more, and even more preferably 50 µm or more. However, when the surface soft layer 20 becomes excessively thick, the tensile strength and fatigue strength are decreased. Therefore, the total thickness of the surface soft layer 20 is set to 200 µm or less, preferably 160 µm or less, more preferably 120 µm or less, and still more preferably 80 µm or less.

When the surface soft layer 20 is formed on only one of the superposition surface of the first member 12, on which the second member 14 is superposed, and the superposition surface of the second member 14, on which the first member 12 is superposed, the "total thickness" means a thickness of the formed surface soft layer 20. When the surface soft layer 20 is formed on both of the superposition surface of the first member 12, on which the second member 14 is superposed, and the superposition surface of the second member 14, on which the first member 12 is superposed, the "total thickness" means a total thickness of the surface soft layers 20 formed on both of the superposition surfaces.

A method of forming the surface soft layer 20 is not particularly limited. When the surface soft layer 20 is a decarburized layer, various known decarburization methods can be applied to an extent that the effect of the present embodiment is not impaired. For example, the decarburized layer may be formed in an atmospheric gas containing a gas that contributes to a decarburization reaction, such as carbon dioxide, air, and water vapor, under a condition of holding at a temperature of 700° C. to 950° C. for 1 hour.

In addition to the decarburization method, for example, a material (a metal plate or the like) having a lower Vickers hardness than the Vickers hardness of the first member 12 or the second member 14 may be formed by cladding (multilayer rolling).

When the surface soft layer 20 is a decarburized layer, a thickness of the decarburized layer is determined by, for example, measuring a thickness of a layer containing ferrite which is a main layer using an optical microscope, an electron microscope, or the like for a sample immediately after decarburization treatment.

(Heat Affected Zone)

As described above, the heat affected zone (HAZ) 40 is a portion of the base plate in which the structure and the mechanical properties are changed by the welding heat and which is not melted, and is formed around the molten-solidified portion 30. The hardness of the heat affected zone 40 in the vicinity of the interface between the first member 12 and the second member 14 greatly affects a deformation amount in a cross tension test. Therefore, in order to obtain good joint strength, the maximum hardness is preferably equal to or less than a predetermined value. Specifically, the maximum Vickers hardness of the surface soft layer 20 in the heat affected zone 40 is 500 Hv or less, preferably 400 Hv or less, more preferably 300 Hv or less, and still more preferably 200 Hv or less.

However, since it is difficult to set the maximum Vickers hardness of the surface soft layer 20 in the heat affected zone 40 to less than 100 Hv from the viewpoint of the properties of a steel sheet, a lower limit of the maximum Vickers hardness of the surface soft layer 20 in the heat affected zone 40 is set to 100 Hv.

The maximum Vickers hardness of the surface soft layer 20 in the heat affected zone 40 can be controlled by forming a decarburized layer on the surface of the first member 12 or the second member 14. Further, as will be described later, in the case of spot welding, after main energization (melting energization) for forming the molten-solidified portion 30, tempering energization can be applied as post-energization to perform control.

The "maximum Vickers hardness of the surface soft layer 20 in the heat affected zone 40" in the present embodiment defined as the maximum hardness in a hardness distribution obtained by measuring a portion corresponding to the surface soft layer 20 in the heat affected zone 40 in a direction perpendicular to the sheet thickness by a Vickers hardness meter. A method of measuring hardness is not limited to the above method, and other measurement methods such as a nanoindenter may be used.

(Molten-Solidified Portion)

The Vickers hardness of the molten-solidified portion 30 greatly affects the toughness of the molten-solidified portion 30 (in the case of spot welding, nugget toughness), and greatly affects a fracture form. Therefore, from the viewpoint of obtaining good joint strength, specifically, the Vickers hardness at the softest portion of the molten-solidified portion 30 is preferably 600 Hv or less, more preferably 500 Hv or less, and still more preferably 350 Hv or less.

However, since it is difficult to set the Vickers hardness at the softest portion of the molten-solidified portion 30 to be less than 200 Hv from the viewpoint of the properties of the steel sheet, a lower limit of the Vickers hardness of the molten-solidified portion 30 at the softest portion is set to 200 Hv.

For example, in the case of spot welding, the Vickers hardness at the softest portion of the molten-solidified portion 30 can be controlled by applying tempering energization as post-energization after main energization (melting energization) for forming the molten-solidified portion 30, as will be described later. The most softened portion of the molten-solidified portion 30 is a portion having the lowest hardness in the molten-solidified portion 30. The "Vickers hardness at the softest portion" in the present embodiment is defined as the minimum hardness in a hardness distribution obtained by measuring a portion of the molten-solidified portion 30 at a depth position of 3 $t_{min}/4$ from a surface of the thinner one of the sheet thickness of the first member 12 and the sheet thickness of the second member 14 in the direction perpendicular to the sheet thickness with a Vickers hardness meter, where the thinner one of the sheet thickness of the first member 12 and the sheet thickness of the second member 14 is defined as $t_{min}$.

Further, as shown in FIG. 1, a diameter D of the molten-solidified portion 30 (nugget diameter in the case of spot welding) and the sheet thickness firm, of the thinner one of the sheet thickness of the first member 12 and the sheet thickness of the second member 14 preferably satisfy the following formula (3).

When the sheet thickness of the first member 12 and the sheet thickness of the second member 14 are the same, the thickness is set to $t_{min}$.

$$D \geq 3.5\sqrt{t_{min}} \quad (3)$$

When the diameter D of the molten-solidified portion 30 is less than $3.5\sqrt{t_{min}}$, stress concentration on the molten-solidified portion 30 becomes remarkable, so that the base plate is not easily deformed during the cross tensile test, and it is difficult to obtain the effect by providing the surface soft layer 20 (decarburized layer). Therefore, the diameter D of the molten-solidified portion 30 is preferably $3.5\sqrt{t_{min}}$ or more, more preferably $3.7\sqrt{t_{min}}$ or more, still more preferably $4.0\sqrt{t_{min}}$ or more, even more preferably $5.0\sqrt{t_{min}}$ or more, and most preferably $5.5\sqrt{t_{min}}$ or more.

The molten-solidified portion 30 is formed by spot welding, but the present invention is not limited thereto. The molten-solidified portion 30 can be formed by using a known welding method such as laser welding or arc welding in addition to spot welding. Welding conditions may be appropriately selected and determined according to design conditions such as required strength and rigidity.

For example, in the case of spot welding, the molten-solidified portion 30 may be formed using a two-stage energization condition in which an applied current value is changed in two stages, a pulse energization condition in which a pulse current is applied, or the like. In this case, an amount of energy to be applied to the molten-solidified portion 30 can be set with high accuracy, and a temperature and a size of the molten-solidified portion 30 can be set finely.

Since a material to be welded is pressed by an electrode at the time of welding, the spot welding can be performed with high quality regardless of a welding position. In addition, in the present technique, existing spot welding equipment for mass production of mild steel or the like can be used as it is, and a special device or control for high tensile strength steel is not necessary.

<Method for Manufacturing Joint Structure>

Next, a method for manufacturing the joint structure will be described. The joint structure 100 according to the embodiment of the present invention is joined by, for example, the following procedure. First, the surface soft layer 20 such as a decarburized layer is formed on the surface of at least one of the first member 12 and the second member 14 each having a carbon amount of 0.21 mass % or more. Then, the first member 12 and the second member 14 are superposed so that the surface soft layer 20 is interposed between the first member 12 and the second member 14. After the first member 12 and the second member 14 are superposed on each other, the first member 12 and the second member 14 are sandwiched between a pair of spot welding electrodes, and a welding current is applied. As a result, the first member 12 and the second member 14 are melted and solidified to form the molten-solidified portion 30 (melted nugget).

An energization pattern is not particularly limited, and multistage energization in which a current value is appropriately changed may be applied as necessary. Pressurization conditions may also be changed during energization or cooling as necessary. An electrode material and an electrode shape may be appropriately selected as long as the effect of the present embodiment obtained by providing the surface soft layer 20 is not impaired.

In the joint structure 100, by providing the surface soft layer 20 at the interface between the first member 12 and the second member 14, the Vickers hardness of the surface soft layer 20 in the heat affected zone 40 obtained by the welding processing of the first member 12 and the second member 14 is controlled to be in a range of 100 Hv or more and 500 Hv or less. By controlling the Vickers hardness of the surface soft layer 20 in the heat affected zone 40 to a predetermined value or less, the deformability in the vicinity of the stress concentration point is improved, so that the base plate portion can be preferentially deformed, and fracture at the molten-solidified portion 30 (nugget) and brittle fracture at the heat affected zone 40 can be effectively prevented.

With the above configuration, the joint structure 100 can obtain a joint structure having excellent toughness and good joint strength. In addition, according to the method for manufacturing the joint structure 100 described above, it is only necessary to use normal spot welding equipment as it is, and welding of the high tensile strength steel members can be appropriately performed without complicatedly controlling the welding conditions and without lowering joint strength.

In manufacturing the joint structure 100, as the welding conditions in spot welding, tempering energization may be applied as post energization after the main energization (melting energization) for forming the molten-solidified portion 30. The tempering energization refers to energization in which the molten-solidified portion 30 is once cooled after the molten-solidified portion 30 is formed by the main energization, and then the molten-solidified portion 30 is heated. By this energization, effects such as further reducing the hardness of the molten-solidified portion 30 and relaxing segregation of elements such as P and S in the molten-solidified portion (nugget) 30 and HAZ can be obtained, and the cross tension strength can be further improved. The tempering energization is not limited to one application, and may be applied several times as needed. In addition, an energization waveform in the tempering energization is not limited, and an optimum waveform such as a pulse energization waveform may be appropriately selected.

Although the embodiments of the present invention have been described above, the present invention is not limited to the above embodiments, and combinations of the respective configurations of the embodiments, or changes and applications made by those skilled in the art based on the description of the specification and the well-known technology are also intended by the present invention and are included within the scope to be protected.

Figure 2:
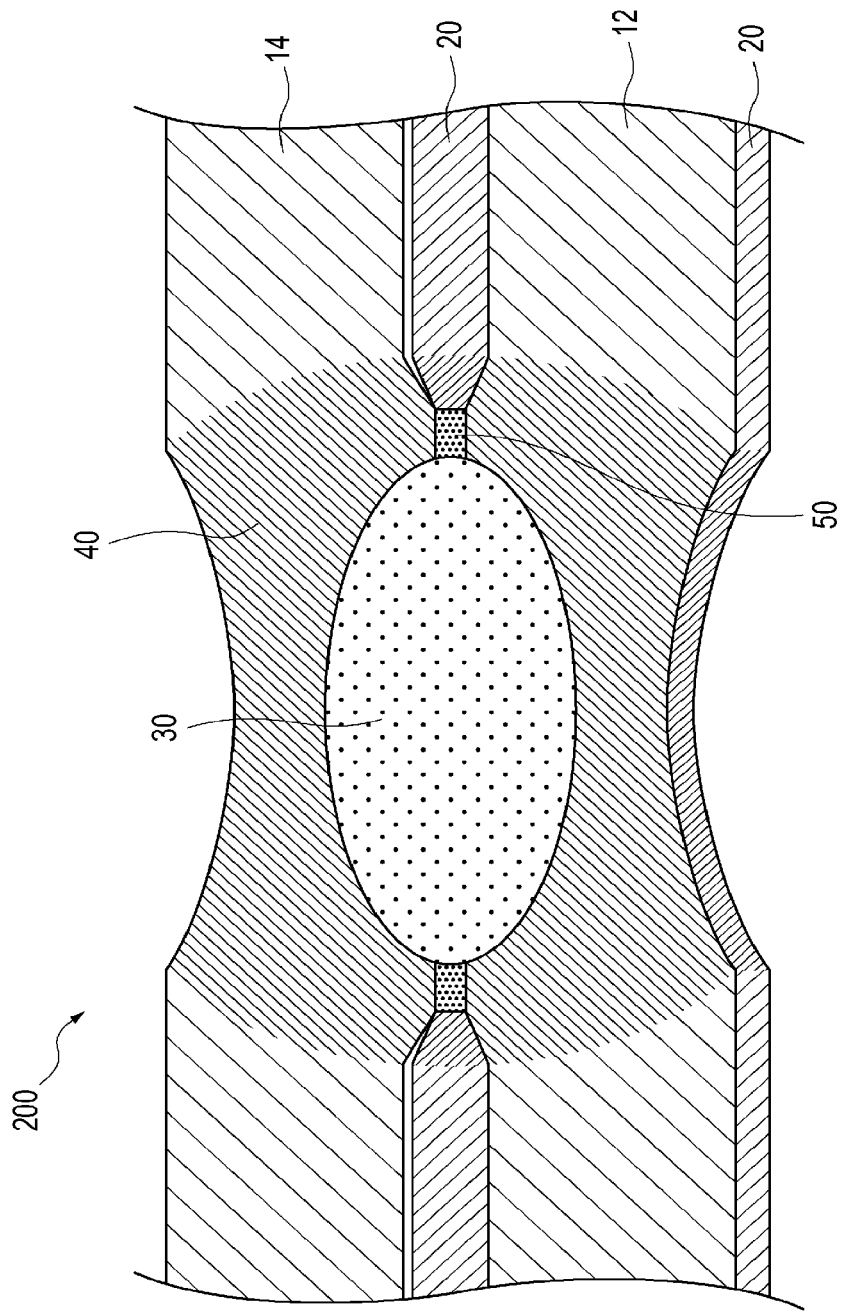
FIG. 2 is a cross-sectional view of a joint structure according to another embodiment of the present invention.

For example, in the embodiment described above, as shown in FIG. 1, the surface soft layer 20 is formed on both surfaces of the first member 12 and the second member 14, but the surface soft layer 20 may be formed on at least one of the superposition surface of the first member 12, on which the second member 14 is superposed, and the superposition surface of the second member 14, on which the first member 12 is superposed, and the surface soft layer 20 may be formed only on the surface of the first member 12 as in a joint structure 200 shown in FIG. 2.

Figure 3:
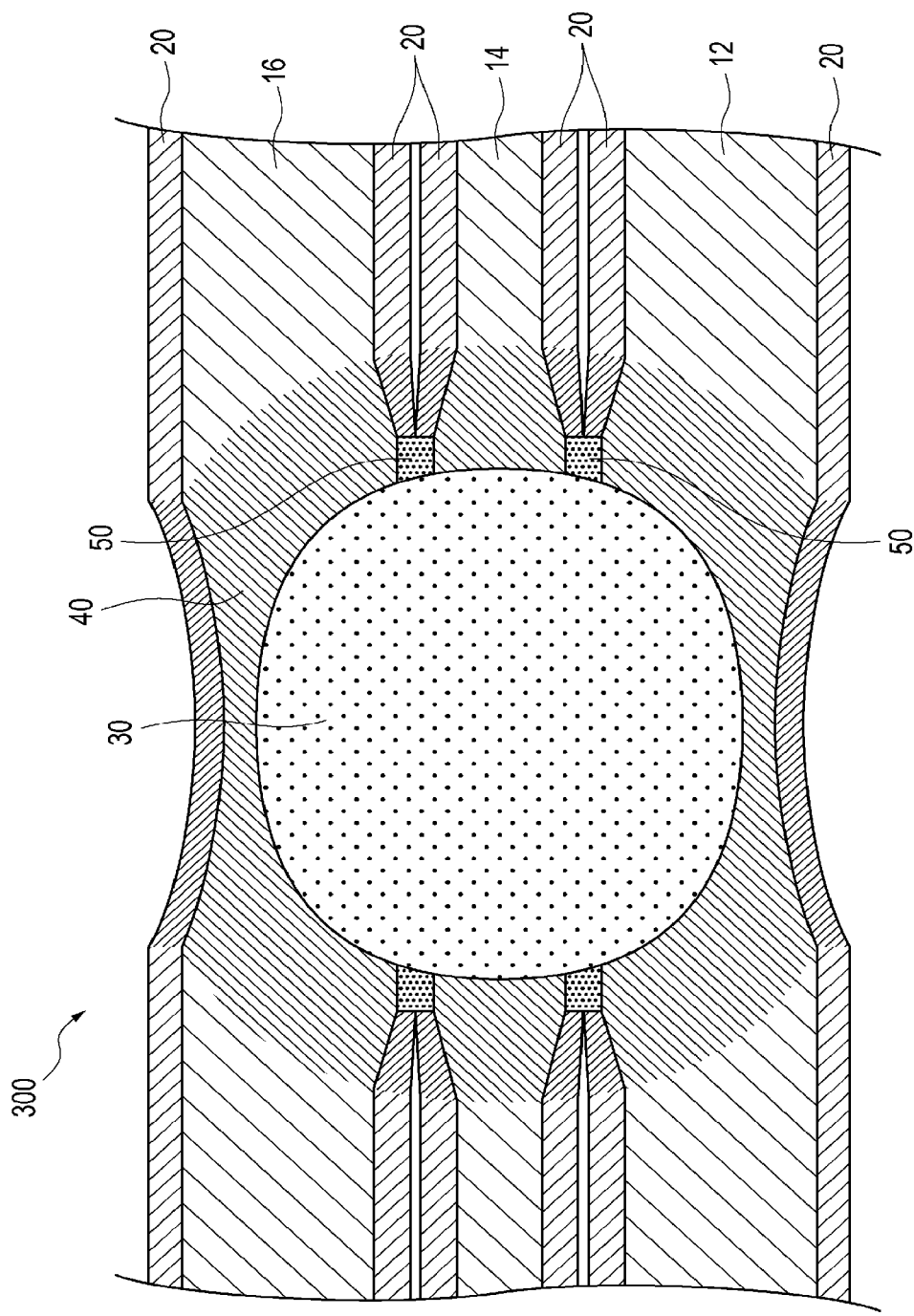
FIG. 3 is a cross-sectional view of a joint structure according to still another embodiment of the present invention.

In addition, in the embodiment described above, the joint structure using two sheets of high tensile strength steel of the first member 12 and the second member 14 has been described as an example, but, for example, as in a joint structure 300 shown in FIG. 3, three sheets of high tensile strength steel (the first member 12, the second member 14, and a third member 16) may be superposed and joined.

EXAMPLE

Hereinafter, the present invention will be described in more detail with reference to Examples and Comparative Examples, but the present invention is not limited to these Examples.

First, for each of Steel 22 MnB, Steel 35 MnB, and Steel S45 C (all having a carbon amount of 0.21 mass % or more) shown in Table 1, steel sheets in which a decarburized layer as a surface soft layer was formed on both surfaces of the steel sheet and steel sheets in which no decarburized layer was formed were prepared. The decarburized layer was formed under conditions of holding at a temperature of 700° C. to 950° C. for 1 hour in an atmospheric furnace. A scale generated by heat treatment was removed by pickling treatment (pickling solution: 10% to 50% hydrochloric acid, temperature: 25° C. to 82° C., pickling time: 20 seconds to 3600 seconds).

As shown in Table 1, various thicknesses (depths) of the decarburized layers were prepared for Steel 22 MnB, Steel 35 MnB, and Steel S45 C. Here, the "thickness of the decarburized layer" means a thickness of the decarburized layer formed on one surface of the steel sheet.

Subsequently, in Examples 1 to 7, any one of Steel 22 MnB, Steel 35 MnB, and Steel S45C on which the decarburized layer was formed was used as a first member and a second member, and the first member and the second member are superposed and welded under the following conditions based on a cross tension test method (JIS Z3137: hereinafter, a description of JIS standard of the cross tension test method is omitted) to prepare a cross tension test piece.

In addition, in Comparative Examples 1 to 7, any one of Steel 22 MnB, Steel 35 MnB, and Steel S45C on which no decarburized layer was formed was used as a first member and a second member, and the first member and the second member were superposed and welded under the following conditions in the same manner as in Examples to prepare a cross tension test piece.

In lap welding, spot welding was performed using an air pressure type single-layer alternating current welding machine under the following energization conditions. Both the upper and lower electrodes were chromium copper electrodes having a tip diameter of 6 mm (tip R40 mm) and a dome radius type (DR electrode). An amount of cooling water flowing through the electrodes was 1.5 L/min both upper and lower.

(Energization Conditions)

Pressure: 400 kgf to 500 kgf

Current value: 5 kA to 8 kA

Energization time: 0.3 sec

Hold time: 0.16 sec

A joint obtained by the spot welding was subjected to a cross tension test based on the above cross tension test method to investigate cross tension strength (CTS).

Subsequently, in a cross section of the joint, the maximum Vickers hardness of a surface soft layer (decarburized layer) in a heat affected zone was measured. A measurement was performed by a Vickers hardness meter under the following conditions, and a hardness distribution in a direction perpendicular to a sheet thickness was investigated. Based on each of the obtained hardness distributions, the maximum Vickers hardness of the surface soft layer (decarburized layer) in the heat affected zone and the Vickers hardness at the softest portion of a molten-solidified portion were determined.

Surface Soft Layer (Decarburized Layer)

Load: 10 gf to 50 gf (a hardness measurement load of the surface decarburized layer was appropriately adjusted according to a decarburized layer thickness.

Measurement pitch: 0.10 mm

Measurement position: from an interface between a corona bond and the heat affected zone to an interface between the heat affected zone and a base plate The heat affected zone was determined by picric acid corrosion. (portion whiter than the base plate)

TABLE 1

| Steel | Sheet thickness t [mm] | Tensile strength | Carbon amount [%] | Thickness of decarburized layer (surface soft layer) [μm] |
|---|---|---|---|---|
| 22MnB | 1.6 | 980 MPa | 0.21 | 0 |
|  |  |  |  | 32 |
| 35MnB | 1.6 | 980 MPa | 0.35 | 0 |
|  |  |  |  | 54 |
| S45C | 1.6 | 980 MPa | 0.43 | 0 |
|  |  |  |  | 47 |

TABLE 2

|  | First member (upper sheet) | | Second member (lower sheet) | | Diameter D of molten-solidified portion (nugget diameter) | | Maximum Vickers hardness of decarburized layer (surface soft layer) in heat affected zone [Hv] | CTS [kN] |
|---|---|---|---|---|---|---|---|---|
|  | Steel | Thickness of decarburized layer [μm] | Steel | Thickness of decarburized layer [μm] | [mm] | X√t (Note 1) | | |
| Example 1 | 22MnB | 32 | 22MnB | 32 | 4.83 | 3.8√t | 382 | 6.13 |
| Example 2 | | | | | 6.53 | 5.2√t | 363 | 8.6 |
| Comparative Example 1 | | 0 | | 0 | 5.28 | 4.2√t | 552 | 5.66 |
| Comparative Example 2 | | | | | 7.08 | 5.6√t | 523 | 8.38 |
| Example 3 | 35MnB | 54 | 35MnB | 54 | 3.02 | 2.4√t | 292 | 3.81 |
| Example 4 | | | | | 3.54 | 2.8√t | 382 | 4.84 |
| Example 5 | | | | | 6.33 | 5.0√t | 363 | 7.96 |
| Comparative Example 3 | | 0 | | 0 | 3.83 | 3.0√t | 624 | 3.79 |
| Comparative Example 4 | | | | | 4.92 | 3.9√t | 553 | 4.41 |
| Comparative Example 5 | | | | | 6.89 | 5.4√t | 509 | 6.79 |
| Example 6 | S45C | 47 | S45C | 47 | 5.64 | 4.5√t | 493 | 5.20 |
| Example 7 | | | | | 6.53 | 5.2√t | 414 | 6.00 |
| Comparative Example 6 | | 0 | | 0 | 5.64 | 4.5√t | 694 | 1.99 |
| Comparative Example 7 | | | | | 6.33 | 5.0√t | 704 | 1.99 |

(Note 1)
"t" means a sheet thickness [mm] of a sheet material to be joined (see Table 1), and "X" is a constant.

Among Examples 1 to 7 shown in Table 2, in Examples 1 and 2, welding was performed on a sheet set of Steel 22 MnB (carbon amount: 0.21 mass %) on which a decarburized layer having a thickness of 32 μm was formed. As shown in Table 2, in Example 1 and Example 2, a nugget diameter (diameter of the molten-solidified portion) is different due to a difference in an energization time during welding.

In Examples 3 to 5, welding was performed on a sheet set of Steel 35 MnB (carbon amount: 0.35 mass %) on which a decarburized layer having a thickness of 54 μm was formed. Similarly, in Examples 3 to 5, the nugget diameter is different due to the difference in the energization time during welding.

In Examples 6 and 7, welding was performed on a sheet set of Steel S45C (carbon amount: 0.43 mass %) on which a decarburized layer having a thickness of 47 μm was formed. Similarly, in Examples 6 and 7, the nugget diameter is different due to the difference in the energization time during welding.

In Comparative Example 1 and Comparative Example 2, welding was performed on a sheet set of Steel 22 MnB (carbon amount: 0.21 mass %) having no decarburized layer. As shown in Table 2, in Comparative Example 1 and Comparative Example 2, the nugget diameter is different due to the difference in the energization time during welding.

In Comparative Examples 3 to 5, welding was performed on a sheet set of Steel 35 MnB (carbon amount: 0.35 mass %) having no decarburized layer. Similarly, in Comparative Examples 3 to 5, the nugget diameter is different due to the difference in the energization time during welding.

In Comparative Examples 6 and 7, welding was performed on a sheet set of Steel S45C (carbon amount: 0.43 mass %) having no decarburized layer. Similarly, in Comparative Examples 6 and 7, the nugget diameter is different due to the difference in the energization time during welding.

As shown in results of Table 2, in all Examples, it was revealed that the maximum hardness of the decarburized layer in the heat affected zone was reduced by forming the decarburized layer, and as a result, the cross tension strength (CTS) was improved.

Examples and Comparative Examples are compared in detail. For example, in an example using a steel sheet of Steel 22 MnB, when Example 1 and Comparative Example 1 were compared with each other under the same test conditions, it was found that in Example 1, the maximum Vickers hardness of the decarburized layer in the heat affected zone was decreased from 552 Hv to 382 Hv, and accordingly, CTS was improved from 5.66 kN to 6.13 kN, as compared with Comparative Example 1.

In addition, in an example using a steel sheet of Steel 35 MnB, when Example 3 and Comparative Example 3 were compared with each other under the same test conditions, it was found that in Example 3, the maximum Vickers hardness of the decarburized layer in the heat affected zone was decreased from 624 Hv to 292 Hv, and accordingly, CTS was improved from 3.79 kN to 3.81 kN, as compared with Comparative Example 3.

Further, in an example using a steel sheet of Steel S45C, when Example 6 and Comparative Example 6 were compared with each other under the same test conditions, it was found that in Example 6, the maximum Vickers hardness of the decarburized layer in the heat affected zone was decreased from 694 Hv to 493 Hv, and accordingly, CTS was improved from 1.99 kN to 5.20 kN, as compared with Comparative Example 6.

When comparing different steel, it was understood that the higher the carbon amount of the steel (that is, the larger the carbon amount of a nugget portion), the higher the effect of improving CTS by forming the decarburized layer. For example, when Example 2 and Comparative Example 2 are compared with each other in Steel 22 MnB having a carbon amount of 0.21 mass %, it was found that in Example 2, the CTS is improved only from 8.38 kN to 8.6 kN, as compared with Comparative Example 2. When Example 7 and Comparative Example 7 are compared with each other in Steel S45C having a carbon amount of 0.43 mass %, it was found that in Example 7, the CTS is greatly improved from 1.99 kN to 6.00 kN, as compared with Comparative Example 7.

This is considered to be because the higher the carbon amount in the steel of the high tensile strength steel sheet is, the higher the rate of decrease in CTS in the case where the decarburized layer is not provided is, so that the effect of improving CTS by providing the decarburized layer appears remarkably.

Further, when comparing different nugget diameters, it was understood that the larger the nugget diameter, the higher the effect of improving CTS by forming the decarburized layer. For example, when Example 6 (nugget diameter $D=4.5\sqrt{t}$) and Example 7 (nugget diameter $D=5.2\sqrt{t}$) in Steel S45C are compared with each other, it was found that in Example 6, the CTS is improved only from 1.99 kN to 5.20 kN, as compared with Comparative Example 6, and in Example 7, the CTS is greatly improved from 1.99 kN to 6.00 kN, as compared with Comparative Example 7.

This is considered to be because, as described above, the stress concentration on the nugget becomes more remarkable as the nugget diameter is smaller, and thus the base plate is less likely to be deformed during the cross tension test, and the effect by providing the decarburized layer is less likely to be obtained.

As described above, the following matters are disclosed in the present specification.

[1] A joint structure, comprising:
a first member comprising a high tensile strength steel;
a second member comprising a high tensile strength steel and superposed on the first member;
a surface soft layer formed on at least one of a superposition surface of the first member, on which the second member is superposed, and a superposition surface of the second member, on which the first member is superposed;
a molten-solidified portion formed by melting and solidifying the first member and the second member; and
a heat affected zone formed around the molten-solidified portion,
wherein the surface soft layer has a total thickness of 5 μm or more and 200 μm or less, and the molten-solidified portion has a carbon amount of 0.21 mass % or more, and
a maximum Vickers hardness of the surface soft layer in the heat affected zone is 100 Hv or more and 500 Hv or less.

According to the joint structure, by providing the surface soft layer at the interface between the first member and the second member, the maximum Vickers hardness in the heat affected zone formed around the molten-solidified portion, which is obtained when the first member and the second member are welded to each other, can be controlled to a predetermined value or less. In cross tension, bending deformation is mainly applied to a material, and the deformability in the vicinity of a stress concentration point is improved by controlling the maximum Vickers hardness of the surface soft layer in the heat affected zone to a predetermined value or less, so that the base plate portion can be preferentially deformed, and fracture in the molten-solidified portion and brittle fracture in the heat affected zone can be effectively prevented. In addition, since a corona bond portion contained in the heat affected zone is also softened, initial cracking and growth in the corona bond portion can be prevented.

[2] The joint structure according to above [1], wherein the surface soft layer is a decarburized layer.

According to the joint structure, when the first member and the second member are joined to each other, by forming a decarburized layer as a surface soft layer between the first member and the second member, an effect can also be obtained that the carbon amount in the molten-solidified portion is diluted by the decarburized layer having a lower carbon amount than that of the first member and the second member. As a result, a joint structure having excellent toughness and good joint strength is obtained due to a decrease in the carbon amount of the molten-solidified portion 30.

[3] The joint structure according to above [1] or [2], wherein a diameter D of the molten-solidified portion and a sheet thickness $t_{min}$ of a thinner one of a sheet thickness of the first member and a sheet thickness of the second member satisfy the following formula (3).

$$D \geq 3.5\sqrt{t_{min}} \quad (3).$$

According to the joint structure, stress concentration on the molten-solidified portion can be prevented, the base plate is easily deformed during a cross tension test, and an effect by providing the surface soft layer (decarburized layer) can be enhanced.

[4] The joint structure according to any one of above [1] to [3], wherein a total thickness of the surface soft layer is 30 μm or more.

According to the joint structure, by forming the surface soft layer on the surface of the first member or the second member, the effect of improving local deformability and improving cross tension strength (CTS) can be enhanced.

[5] A method for manufacturing the joint structure according to any one of above [1] to [4], the method comprising:
superposing the second member on the first member so that the surface soft layer formed on a surface of at least one of the first member and the second member is interposed between the first member and the second member, and then
forming the molten-solidified portion by welding.

According to the method for manufacturing the joint structure, in joining of high tensile strength steel sheets having good mechanical properties of a base plate and having a large component amount of basic constituent elements in steel, particularly a large carbon amount, the toughness of the molten-solidified portion can be increased, and the joint strength (cross tension strength) can be improved without impairing weldability.

Although the embodiments are described above with reference to the drawings, it is needless to say that the present invention is not limited to such examples. It will be apparent to those skilled in the art that various changes and modifications may be conceived within the scope of the claims. It is also understood that the various changes and modifications belong to the technical scope of the present invention. Constituent elements in the embodiments described above may be combined freely within a range not departing from the spirit of the present invention.

The present application is based on Japanese Patent Application (Japanese Patent Application No. 2018-216804) filed on Nov. 19, 2018, and contents thereof are incorporated herein by reference.

REFERENCE SIGNS LIST

12 First member
14 Second member

16 Third member
20 Surface soft layer (decarburized layer)
30 Molten-solidified portion
40 Heat affected zone
50 Corona bond
100, 200, 300 Joint structure

The invention claimed is:

1. A joint structure, comprising:
a first member comprising a high tensile strength steel;
a second member comprising a high tensile strength steel and superposed on the first member;
a surface soft layer formed on at least one of a superposition surface of the first member, on which the second member is superposed, and a superposition surface of the second member, on which the first member is superposed;
a molten-solidified portion formed by melting and solidifying the first member and the second member; and
a heat affected zone formed around the molten-solidified portion,
wherein the surface soft layer has a total thickness of 5 µm or more and 200 µm or less, and the molten-solidified portion has a carbon amount of 0.21 mass % or more, and
a maximum Vickers hardness of the surface soft layer in the heat affected zone is 100 Hv or more and 500 Hv or less.

2. The joint structure according to claim 1, wherein the surface soft layer is a decarburized layer.

3. The joint structure according to claim 2, wherein a diameter D of the molten-solidified portion and a sheet thickness $t_{min}$ of a thinner one of a sheet thickness of the first member and a sheet thickness of the second member satisfy the following formula (1):

$$D \geq 3.5\sqrt{t_{min}} \qquad (1).$$

4. The joint structure according to claim 3, wherein a total thickness of the surface soft layer is 30 µm or more.

5. A method for manufacturing the joint structure according to claim 4, the method comprising:
superposing the second member on the first member so that the surface soft layer formed on a surface of at least one of the first member and the second member is interposed between the first member and the second member, and then
forming the molten-solidified portion by welding.

6. A method for manufacturing the joint structure according to claim 3, the method comprising:
superposing the second member on the first member so that the surface soft layer formed on a surface of at least one of the first member and the second member is interposed between the first member and the second member, and then
forming the molten-solidified portion by welding.

7. The joint structure according to claim 2, wherein a total thickness of the surface soft layer is 30 µm or more.

8. A method for manufacturing the joint structure according to claim 2, the method comprising:
superposing the second member on the first member so that the surface soft layer formed on a surface of at least one of the first member and the second member is interposed between the first member and the second member, and then
forming the molten-solidified portion by welding.

9. A method for manufacturing the joint structure according to claim 7, the method comprising:
superposing the second member on the first member so that the surface soft layer formed on a surface of at least one of the first member and the second member is interposed between the first member and the second member, and then
forming the molten-solidified portion by welding.

10. The joint structure according to claim 1, wherein a diameter D of the molten-solidified portion and a sheet thickness $t_{min}$ of a thinner one of a sheet thickness of the first member and a sheet thickness of the second member satisfy the following formula (1):

$$D \geq 3.5\sqrt{t_{min}} \qquad (1).$$

11. The joint structure according to claim 10, wherein a total thickness of the surface soft layer is 30 µm or more.

12. A method for manufacturing the joint structure according to claim 11, the method comprising:
superposing the second member on the first member so that the surface soft layer formed on a surface of at least one of the first member and the second member is interposed between the first member and the second member, and then
forming the molten-solidified portion by welding.

13. A method for manufacturing the joint structure according to claim 10, the method comprising:
superposing the second member on the first member so that the surface soft layer formed on a surface of at least one of the first member and the second member is interposed between the first member and the second member, and then
forming the molten-solidified portion by welding.

14. The joint structure according to claim 1, wherein a total thickness of the surface soft layer is 30 µm or more.

15. A method for manufacturing the joint structure according to claim 14, the method comprising:
superposing the second member on the first member so that the surface soft layer formed on a surface of at least one of the first member and the second member is interposed between the first member and the second member, and then
forming the molten-solidified portion by welding.

16. A method for manufacturing the joint structure according to claim 1, the method comprising:
superposing the second member on the first member so that the surface soft layer formed on a surface of at least one of the first member and the second member is interposed between the first member and the second member, and then
forming the molten-solidified portion by welding.

* * * * *